United States Patent [19]

Feierabend et al.

[11] 4,071,869

[45] Jan. 31, 1978

[54] ASSEMBLING FLEXIBLE DISK RECORD STRUCTURES

[75] Inventors: Louis Bock Feierabend, Boulder; David Staples Proper, Arvada, both of Colo.

[73] Assignee: International Business Machines Corporation, Armonk, N.Y.

[21] Appl. No.: 691,806

[22] Filed: June 1, 1976

[51] Int. Cl.² .......................... G11B 5/82; G11B 5/86
[52] U.S. Cl. ........................................ 360/135; 360/17
[58] Field of Search ........................... 360/135, 99, 17; 156/64

[56] References Cited

U.S. PATENT DOCUMENTS

| | | | |
|---|---|---|---|
| 3,303,485 | 2/1967 | Lee | 360/99 |
| 3,761,333 | 9/1973 | Kleinbeck et al. | 360/135 |
| 3,891,796 | 6/1975 | Takahara et al. | 360/99 |
| 3,898,814 | 8/1975 | Chou et al. | 360/99 |
| 3,931,645 | 1/1976 | Dodd et al. | 360/99 |
| 3,940,793 | 2/1976 | Bleiman | 360/99 |

OTHER PUBLICATIONS

Kendall et al.; Application of Position Sense Indicia to Flexible Disks; IBM Tech. Disc. Bull., vol. 19, No. 2, 7/76, p. 586.

Primary Examiner—Robert S. Tupper
Attorney, Agent, or Firm—Herbert F. Somermeyer

[57] ABSTRACT

Method and apparatus for assembling a flexible record disk member to a non-flexible center support ring and substantially simultaneously recording servo signals on the flexible disks concentrically with respect to the support ring whereby the recorded servo signals are precisely coaxial to the non-flexible ring support.

11 Claims, 2 Drawing Figures

ASSEMBLING FLEXIBLE DISK RECORD STRUCTURES

BACKGROUND OF THE INVENTION

The invention relates to manufacturing apparatus and methods for the assembly of precisely constructed flexible disk record storage structures.

As data processing systems become more demanding, the compact storage of digital data signals with relatively rapid access is becoming a more important feature of data processing systems. The storage and access of data bases is becoming a more monumental problem. To enhance data processing systems, record storage apparatus such as shown in U.S. Pat. No. 3,940,794, have been invented. Such apparatus provides good compactness while enhancing (reducing) access time. The apparatus employs flexible record storage disks such as disks having a Mylar substrate. Such substrates are subject to solid flow conditions. That is, during the assembly and after the assembly, the precise shape of the record storage disk may change. Such changes normally are considered insignificant. For example, the magnitude of such changes in the assembly due to temperature and pressures and so forth, may be a small portion of a millimeter. However when such material is used in connection with digital data storage, such apparent minute changes become significant. At several hundred tracks per centimeter, such changes may be several track widths — making track location difficult.

Such digital data storage apparatus may employ 60 tracks per centimeter. A transducer is positioned with respect to a given track by a so-called track following servo mechanism. Such servo mechanisms are subject to error by perturbations in the concentricity of the record storage tracks. That is, if the record storage track is off-center with respect to the true axis of rotation, either the servo mechanism for track following does not follow the track precisely resulting in data errors, or the cost of the data storage apparatus can be inordinately increased. Accordingly, it is extremely important that the flexible record storage disks be precisely concentric with the axis of rotation of the stack of disks for facilitating faithful storage and reproduction of digital data signals. The same criteria of course, also applies to image data storage systems.

A disk storage structure for achieving the concentricity required above, is set forth in commonly assigned copending patent application Ser. No. 564,406, Griffiths et al, filed Apr. 2, 1975, and now U.S. Pat. No. 3,969,767. In the latter application, the flexible storage disk structure consists of a flexible record storage member having a cold flowable substrate such as Mylar film suitably attached to a center semi-rigid ring support member. The ring supports are faced together to form a laminated tubular spindle for supporting a stack of disks as shown in the latter referenced patent application. The flexible record member and a center support ring member must be coaxial to ensure concentricity of the record tracks with respect to the axis of rotation.

SUMMARY OF THE INVENTION

It is an object of the present invention to provide method and apparatus for the precise coaxial assembly of a flexible record member having a center support ring while substantially simultaneously providing a concentricity of the two members and recording predetermined signals on the record storage member.

In accordance with the invention, the method of precisely manufacturing a flexible record disk member structure for later assembly into a disk stack apparatus includes the steps of centering a relatively non-flexible support ring coaxial to a first assembly axis; a flexible record disk member is approximately coaxially disposed with respect to the first assembly axis. Then the ring and disk members are coaxially oriented and secured to each other. While the two members are held firmly in place, predetermined signals are recorded on the flexible record disk member in precise concentricity to the first assembly axis.

Apparatus constructed in accordance with the invention includes an annular platen disposed coaxially about a first axis. A first frustoconical cylindrical support is axially movably disposed with respect to said first axis, while precisely coaxially supporting a disk support ring. A second frustoconical cylindrical support is also coaxially disposed with respect to the first axis and axially movable with respect thereto. The second support has a second diameter for approximately coaxially locating said flexible record storage disk with respect to said first axis. Means are included for simultaneously axially moving said ring and disk to said platen for securing the ring and disk together. Magnetic recording means coaxial to said first axis then record signals on the disks.

The foregoing and other features and advantages of the invention will be apparent from the following more particular description of preferred embodiments of the invention, as illustrated in the accompanying drawing.

THE DRAWING

DETAILED DESCRIPTION

Figure 1:
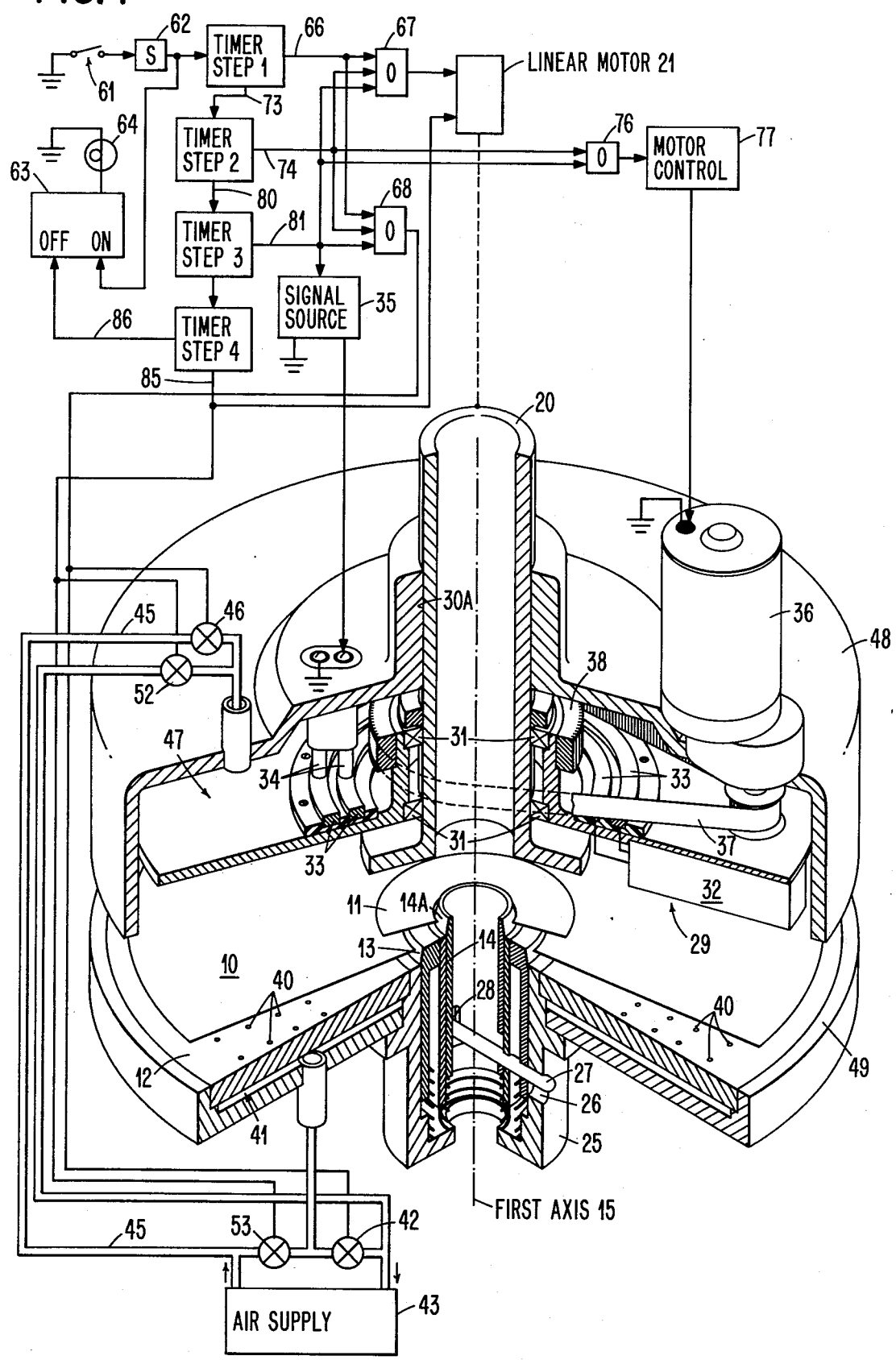
FIG. 1 is a combined electrical and mechanical diagrammatic showing of apparatus employing the present invention in a disk and spacer receiving state.

Referring now more particularly to the drawing, like numerals indicate like parts and structural features in the two views. The apparatus and methods of the invention precisely coaxially secure an apertured flexible record disk 10 to a non-flexible center support ring 11. Ring 11 is preferably the washer-spacer disclosed in Griffiths et al, supra. Annular air permeable platen 12 supports flexible disk 10 for the assembly operation. Flexible record disk 10 is first disposed over frustoconical spring loaded member 13. Then non-flexible ring 11 is disposed over the frustoconical portion of inner slide 14 which is also spring loaded to the illustrated position of FIG. 1. Both the outer slide 13 and inner slide 14 are precisely coaxially movable along first axis 15.

Figure 2:
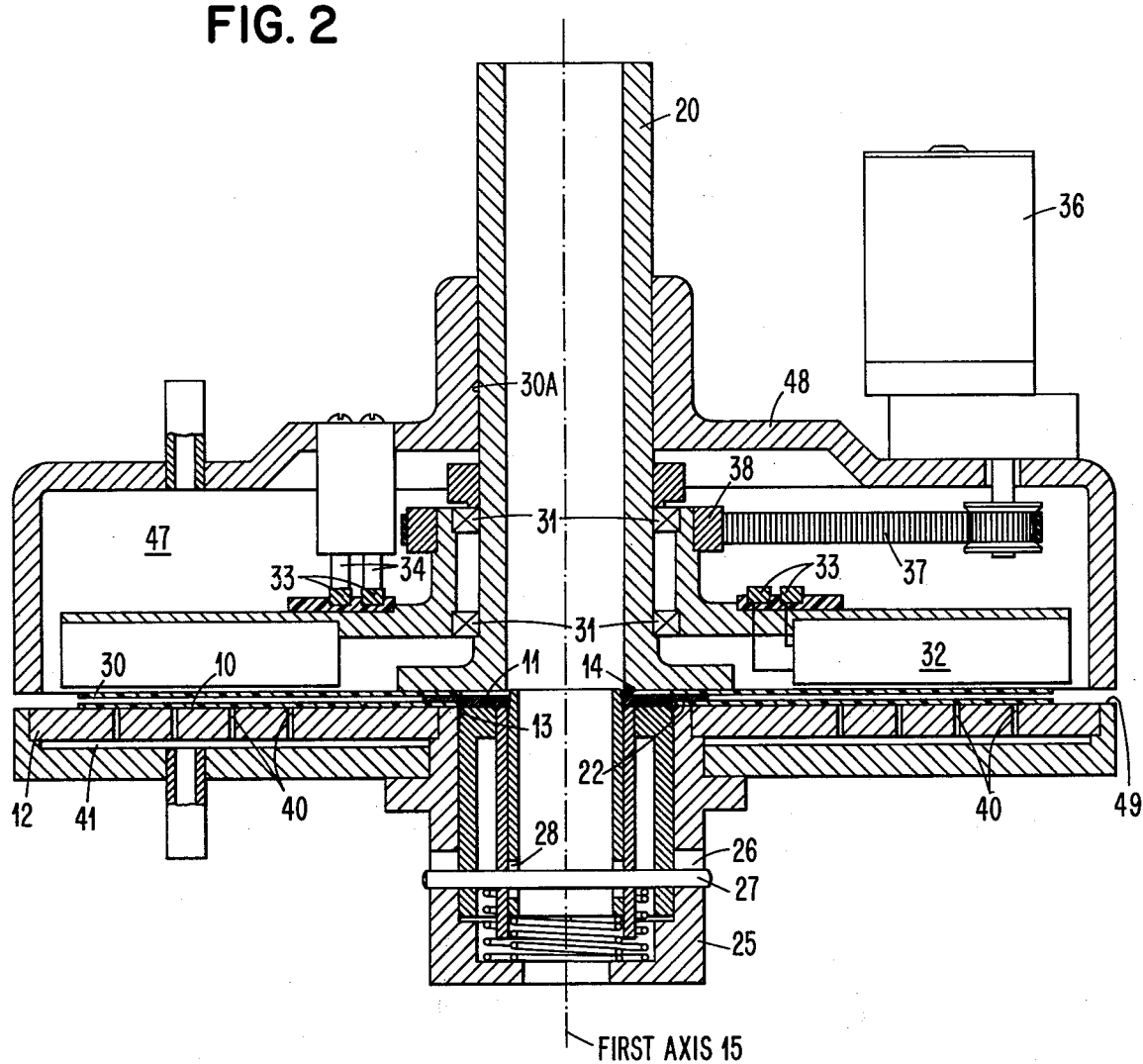
FIG. 2 is a diagrammatic showing of a portion of the FIG. 1 apparatus in a disk-to-ring securing state for facilitating concentric recording of predetermined signals on a record storage disk.

To secure the disk and the ring together, linear motor 21 moves coaxial ram 20 to a downward or closed position shown in FIG. 2 which bears against ring 11 forcing the ring 11 and the disk 10 together. Either disk 10 or ring 11 has an adhesive coating for securing the two members together upon contact. In the preferred ring-spacer configuration, ring 11 has an outer annular shoulder 22 coated with a suitable adhesive for securing ring 11 and disk 10 as described in Griffiths et al, supra.

As ram 20 bears on ring 11, outer sleeve 13 moves downwardly to be flush with the upper surface of platen 12. Similarly, inner sleeve 14 also moves downwardly as ring 11 engages frustoconical portion 14. The described axial motion is permitted along frame 25 by elongated slots 26 receiving guide pin 27. Similarly, inner sleeve 14 has elongated slot 28 for permitting relative axial motion of the sleeves 13, 14.

Once ram 20 has secured ring 11 to disk 10, track location signals can then be recorded on disk 10. Such track location or identification signals are well known and can include those shown in U.S. Pat. No. 3,185,972 to Sippel.

When the apparatus of the invention is to employ transfer recording, one of two transfer techniques may be employed. A magnetic recording pattern may be embossed or otherwise imposed on the surface of platen 12 for being exposed to the remanent magnetic fields during transfer. A second transfer technique is to insert a master recording disk 30 over ring 11 and disk 10 prior to moving ram 20 into its securing position.

The remainder of the description may use either described technique, it being preferred that master disk 30 be disposed as shown. Tubular ram 20 is precisely coaxially disposed with respect to first axis 15. Additionally, the outer surface 30A of tubular ram 20 is machined such that it is also precisely concentric with sleeve 14. A magnetic biasing apparatus 29 is rotatably mounted on surface 30A by precision bearings 31. Biasing apparatus 29 includes a biasing coil 32 electrically connected via a pair of slip rings 33 and suitably noise-free brushes 34 to a source of bias signals 35. The transfer recording is achieved by a starting motor 36 for rotating the biasing assembly 32 via drive belt 37 and sprocketed driven pulley 38. As the energized biasing coil 32 rotates over disk 10, the remanent magnetization of the master disk 30A (can be on platen 12) transfers the magnetic patterns to flexible record disk 10. Principles of such a transfer are well known and are not further described. To ensure precise transfer, pressure and vacuum applied to disk 10 secures it flatly against the upper face of platen 12. To this end, platen 12 includes a plurality of air communicating apertures 40 or can be of air permeable material, such as machined sintered bronze. A plenum 41 is in fluid communication with the air permeable portions 40 of platen 12. Plenum 41 during the recording process has air pumped therefrom via control valve 42 by air supply 43. Simultaneously, air supply 43 provides positive pressure air through conduit 45 and control valve 46 to upper plenum 47 formed when the housing 48 travels downwardly with ram 20 to engage platen 12 at outer circumference 49. Air in plenum 47 bears against master disk 30 and hence, against disk 10 ensuring good contact between master disk 30 and the flexible record disk 10. Upon completion of the transfer recording operation, pressure is introduced into plenum 41 forcing disk 10 away from platen 12 simultaneously with a vacuum being pulled in chamber 47. This action is achieved simultaneously by control valve 52 connecting air supply 43 with plenum 47 and by control valve 53 connecting pressure side of air supply 43 to plenum 41. Such releasing action occurs simultaneously with tubular ram 20 moving upwardly.

In the alternative, bias coil 32 may be replaced by a plurality of magnetic recording heads for recording track location or indicating signals using known digital or analog recording techniques. In that instance, a tachometer (not shown) is secured with the rotating portion of the recording apparatus such that circumferential positioning of track location signals may be precisely controlled. Additionally, radial positioning of the track location signals can be achieved by accurately locating the transducers (not shown) for recording the track location signals within the rotating support 60.

Sequencing the illustrated apparatus, once the articles to be processed are inserted over platen 12, is simply achieved by a set of four timers. The operator (not shown) after inserting articles 10, 11 and 30 actuates the machine for simultaneous assembly and recording by closing start switch 61. Noise rejection integrator 62 detects the switch 61 contact closure and simultaneously actuates timer step 1 and sets latch 63 to the active condition. Latch 63 lights indicating lamp 64 showing the operator that an assembly operation is in process. Timer step 1 supplies a continuous output signal during its time out period over line 66 through OR circuit 67 to actuate linear motor 21 to move tubular ram 20 toward the downward position. The line 66 signal also travels through OR circuit 68 to actuate control valves 46 and 42. Just prior to timer step 1 timing out and removing the line 66 signal, timer step 1 supplies an actuating signal over line 73 actuating timer step 2 circuit. Timer step 2 circuit supplies a continuous signal durings its time out period over line 74 also to OR circuits 67 and 68. Additionally, the timer step 2 signal supplies its line 74 signal through OR circuit 76 to motor control 77 of recording apparatus to actuate motor 36. From the above description, it is apparent that during timer step 1, ram 20 moves downwardly for securing disk 10 to ring 11. During timer step 2, the linear motor 21 is kept in the downward position while motor 36 begins to rotate in preparation for the above described recording operation. Just prior to time out of timer step 2 and while the line 74 signal is still active, timer step 2 supplies an activating signal over line 80 to activate timer step 3. Timer step 3 also supplies a continuous signal over line 81 during its time out period to OR circuits 67 and 68. Additionally, its signal also travels through OR circuit 76 to keep motor 36 rotating support 60. Additionally, the timer step 3 signal actuates signal source 35 to supply recording control signals through brushes 34, and slip rings 33 to the biasing coil 32. In an early embodiment, the actuating signal consisting of a 90 volt DC signal for inducing a predetermined flux field through master disk 30 and record storage disk 10. Accordingly, timer step 3 controls the illustrated apparatus during the recording operation, but before tubular ram 20 releases the secured members 11.

The last step in the operation is controlled by timer step 4 which releases ram 20 and reverses the air flow plenums 41, 47 for releasing disk 10 from platen 12. Timer step 4 supplies this activating signal continuously during this time out period over line 85 to simultaneously activate valves 52, 53. It should be noted that valves 46, 42 now are closed. Also, timer step 4, line 85 signal travels to linear motor 21 for causing ram 20 to move upwardly. The actuation of motor 36 has been removed from motor control 77. Motor control 77 may have a usual stopping circuit which reverses flow of current (plugging) in motor 36 for rapidly stopping port 60 from rotating. Just prior to timer step 4 timing out it supplies an activating signal over line 86 resetting latch 63 and extinguishing lamp 64. Such action indicates to the operator that the assembly recording operation has been completed and the assembled parts may be removed.

It is to be understood that rather than having manual insertion and removal of the assembled parts as well as master disk 30, automatic means (not shown) may be employed.

While the invention has been particularly shown and described with reference to a preferred embodiment thereof, it will be understood by those skilled in the art that various changes in form and details may be made therein without departing from the spirit and scope of the invention.

What is claimed is:

1. Manufacturing apparatus, comprising:
a frame;
a circular platen on said frame and for supporting a flexible magnetic record member;
first means on said frame and being coaxial to said platen for centering said flexible magnetic record member with respect to a first axis;
second means on said frame and being coaxial to said first means and axially movable with respect thereto and for receiving a non-flexible circularly ring shaped member;
a press on said frame and coaxial to said first axis and axially relatively movable therealong between open and closed positions with respect to said circular platen;
actuating means for relatively moving said press against said second means and said platen for permanently adhering said ring member to said record member in a coaxial relationship; and
recording means coaxially disposed to said first axis for recording predetermined circumferentially extending magnetic signals on said record member while stationarily disposed on said platen and after said members are secured to each other.

2. Apparatus set forth in claim 1 wherein said press has a bearing coaxial to said first axis; and
said recording means being mounted on said bearing for rotation about said press in axial juxtaposition to said record member.

3. Apparatus set forth in claim 2 further including means operative when said press is in said closed position for actuating said recording means to rotate about said press and record said predetermined signals on said record member.

4. Apparatus set forth in claim 1 wherein said first means is a first axially elongated sleeve with a upward facing frustoconical outer surface for receiving the ring shaped member; and
said second means is a second axially elongated sleeve in axial sliding contact with said first sleeve and being disposed thereabout, said second axially elongated sleeve having an upwardly facing frustoconical outer surface for receiving the record member.

5. Apparatus set forth in claim 4 wherein said press includes an annular foot extending radially from an intermediate circular line on said frustoconical surface of said first sleeve outwardly to a circular line on said platen; and
said second sleeve also having a flat surface inwardly concentric to said frustoconical surface thereof disposed in parallel to said platen.

6. Apparatus set forth in claim 1 further including a master magnetic disk having predetermined magnetic signal patterns and being disposed on said platen to be in magnetic interacting proximity to said flexible record member and being centered with respect to said first axis by one of said frustoconical surfaces; and
said recording means including a bias signal means disposed on said press for axial movement therewith to supply magnetic bias signals coaxial to said first axis through said master disk and said record member for transfer recording said predetermined signals on said record member.

7. Manufacturing apparatus, comprising:
an annular platen disposed coaxially about a first axis;
a first frustoconical cylindrical support coaxial to said first axis and being axially movably disposed with respect to the annular platen and having a first effective diameter in said conical portion for precisely coaxially supporting a disk support ring;
a second frustoconical cylindrical support coaxially disposed about said first support and being coaxial to said first axis and independently axially movable along said first axis and having a second effective diameter in its conical portion for coaxially supporting a flexible annular magnetic disk with respect to said support ring;
means axially moving said ring and disk to said platen for permanently attaching same to each other; and
magnetic recording means coaxial to said first axis and having a portion operative to record signals on said disk while disposed on said annular platen precisely coaxial to said first axis.

8. The method of precisely manufacturing a flexible record disk member structure for enabling later precise assembly as a disk stack apparatus, the steps of:
centering a support ring on a truncated conical support coaxial to a first axis and having a first effective radius;
centering a flexible record disk member on a precisely coaxial truncated conical support coaxial to said first axis having an effective radius greater than the first radius;
securing the ring and disk member while coaxially oriented by the supports; and
while maintaining the secured ring and record disk member coaxial to the first axis, recording servo data signal on the record disk member coaxially to said first axis by apparatus having a precise coaxial relationship to the first axis.

9. The method set forth in claim 8 further including placing a master magnetic disk having predetermined magnetic signals on one of said supports at its frustoconical portion to be in a facing relationship to said flexible record disk member in a predetermined magnetic relationship to enable transfer recording; and
supplying a magnetic bias signal for transferring signals from said master disk to said record disk member for recording said predetermined magnetic signals in said record disk member.

10. A record storage disk assembly manufactured in accordance by the method set forth in claim 9.

11. A record storage disk assembly manufactured by the method set forth in claim 8.

* * * * *